(12) United States Patent
Olivieri et al.

(10) Patent No.: US 9,187,253 B2
(45) Date of Patent: Nov. 17, 2015

(54) METHOD OF, AND APPARATUS FOR, TRANSPORTING AND/OR MEASURING ITEMS OF LAUNDRY

(71) Applicant: Herbert Kannegiesser GmbH, Vlotho (DE)

(72) Inventors: Andreas Olivieri, Minden (DE); Frank Schormann, Vlotho (DE); Norbert Kortner, Bad Oeynhausen (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 123 days.

(21) Appl. No.: 14/210,890

(22) Filed: Mar. 14, 2014

(65) Prior Publication Data
US 2014/0291123 A1 Oct. 2, 2014

(30) Foreign Application Priority Data
Mar. 27, 2013 (DE) .................. 10 2013 005 251

(51) Int. Cl.
*B65G 17/20* (2006.01)
*D06F 67/04* (2006.01)
*D06F 95/00* (2006.01)

(52) U.S. Cl.
CPC ............... *B65G 17/20* (2013.01); *D06F 67/04* (2013.01); *D06F 95/00* (2013.01)

(58) Field of Classification Search
CPC ......... D06F 67/04; D06F 95/00; B65G 17/20; B65G 43/08; B65G 2201/0229; B65G 2203/0216
See application file for complete search history.

(56) References Cited

U.S. PATENT DOCUMENTS

| 4,774,505 A | 9/1988 | Ueda | |
| 5,168,645 A * | 12/1992 | Robin | D06F 95/00 198/465.4 |
| 5,349,768 A * | 9/1994 | Ishihara | D06F 95/00 198/465.4 |
| 6,826,856 B1 * | 12/2004 | McCabe | D06F 67/04 38/143 |

FOREIGN PATENT DOCUMENTS

| DE | 3912977 A1 | 10/1990 |
| DE | 4014877 A1 | 11/1991 |

(Continued)

OTHER PUBLICATIONS

European Patent Office, Europaischer Teilrecherchenbericht (Search on related patent application), May 19, 2014.
European Patent Office, Europaischer Recherchenbericht (Search on related patent application), Oct. 8, 2014.

*Primary Examiner* — Mark A Deuble
(74) *Attorney, Agent, or Firm* — Laurence P. Colton; Smith Risley Tempel Santos LLC

(57) ABSTRACT

Items of laundry (10) are fed, in laundries, to a laundry-treatment device with adjacent corners (25) of an upper edge (39) hanging beneath two clip carriages (22). It is customary for the items of laundry (10) to be stored in a sorted state on an interim basis upstream of the laundry-treatment device. The invention provides for adjacent clip carriages (22) of successive items of laundry (10) to be assigned in pairs to drivers (28) of a catch conveyor (26). The invention also provides for the sagging of the upper edge (39), and the lowermost location (40) of the lower edge (42), of the item of laundry (10) to be determined by a line-measuring device (26), in order for the item of laundry (10) to be identified in this way.

19 Claims, 3 Drawing Sheets

(56) References Cited

FOREIGN PATENT DOCUMENTS

| | | | |
|---|---|---|---|
| DE | 4143069 | A1 | 7/1993 |
| EP | 0982428 | A1 | 3/2000 |
| EP | 2113606 | A2 | 11/2009 |
| GB | 1556077 | A | 11/1979 |

\* cited by examiner

METHOD OF, AND APPARATUS FOR, TRANSPORTING AND/OR MEASURING ITEMS OF LAUNDRY

STATEMENT OF RELATED APPLICATIONS

This application claims priority on German Patent Application No. DE 10 2013 005 251.3 having a filing date of 27 Mar. 2013.

BACKGROUND OF THE INVENTION

1. Technical Field

The invention relates to a method of transporting items of laundry by means of which items of laundry hanging on clip carriages by adjacent corners of one edge are transported to a treatment device, wherein the clip carriages are displaced along a rail by drivers which are moved along the rail, and wherein the clip carriages are supplied to the driver by a separating device at the start of the rail. The invention also relates to a method of measuring items of laundry, wherein the items of laundry are transported past a measuring device individually with opposite corners of one edge hanging in clip carriages which can be displaced along a rail, and to a method of measuring items of laundry, wherein the items of laundry are transported past a measuring device individually with opposite corners of one edge hanging beneath clip carriages. Finally, the invention relates to an apparatus for transporting items of laundry by means of which items of laundry hanging on clip carriages by adjacent corners of one edge are transported to a treatment device, having a feed conveyor with a rail, and having a downstream rail, along which the clip carriages can be moved, and having a separating device at the end of the rail of the feed conveyor.

2. Prior Art

Items of laundry such as so-called flat linen, but also items of clothing, are fed to a treatment device in a state in which they hang on two individual clip carriages by two adjacent corners of one edge or of one periphery. The items of laundry are preferably stored on an interim basis upstream of the treatment device. This interim storage takes place with the items of laundry sorted in storage sections of a store, that is to say the items of laundry are stored on an interim basis in a state in which they are separated according to type. The items of laundry are preferably sorted according to type, for example as covers, bed sheets, pillow cases, tablecloths or the like, but possibly also as overalls, shirts, trousers or the like.

In the case of known methods and apparatuses of this kind, the clip carriages are introduced individually into an advancing catch conveyor, this operation being time-consuming. Moreover, the operation of measuring the items of laundry, which is necessary for sorting purposes, is incomplete in the case of known methods and apparatuses.

BRIEF SUMMARY OF THE INVENTION

It is an object of the invention to create a method and an apparatus by means of which items of laundry are transported and measured and which allow high throughputs, with a high level of reliability, and are of straightforward construction.

A method of achieving this object is a method by means of which items of laundry hanging on clip carriages by adjacent corners of one edge are transported to a treatment device, wherein the clip carriages are displaced along a rail by drivers which are moved along the rail, and wherein the clip carriages are supplied to the driver by a separating device at the start of the rail, characterized in that adjacent clip carriages of successive items of laundry are supplied to a respective driver in pairs by the separating device. Accordingly, items of laundry hanging on clip carriages by adjacent corners of one edge or of one periphery are transported to a treatment device by adjacent clip carriages of successive items of laundry being supplied to a respective driver of the catch conveyor in pairs by a separating device. Once first of all a first clip carriage, on which the front corner of a first item of laundry is hanging, is fed on its own to the respective driver by the separating device, there are then always two clip carriages, retaining adjacent corners of successive items of laundry, supplied at the same time, preferably successively, to a respective driver of the catch conveyor. This results in a considerably increased feed capacity.

Preferably in each case two successive clip carriages, retaining adjacent corners of successive items of laundry, are advanced along the rail together, to be precise preferably in contact with one another, by a respective single driver. This means that just one driver transports two clip carriages at the same time.

Provision is made, in particular, for the clip carriages on the respective driver to be advanced along an oblique rail which slopes upwards in the transporting direction. This means that (with the exception of the first clip carriage of the first item of laundry) a driver always displaces two clip carriages along the rail. The in each case two clip carriages, in contact with one another, are thus pushed along the obliquely upwardly sloping rail in pairs by always just a single driver. This results in controlled advancement of the respective pair of clip carriages.

An advantageous development of the method provides for clip carriages retaining adjacent corners of the edge of the respective item of laundry to be advanced along the rail by successive, spaced-apart drivers. All the drivers of the catch conveyor assigned to the rail here are spaced apart by a defined, identical and also constant distance. This procedure ensures that, during transportation along the rail, the clip carriages retaining opposite corners of the preferably upper periphery or of the upper edge of the item of laundry are always spaced apart by the same distance, although each driver always pushes along in front of it two clip carriages, as a pair of clip carriages, because the drivers advance, in particular each driver advances, two clip carriages with different items of laundry. The identical distance between the clip carriages retaining adjacent corners of the edge or of the periphery of each item of laundry gives rise, beneath the clip carriage, to a defined sagging, that is to say a loop, of each item of laundry. This sagging or this loop is always the same size for items of laundry which are identical or of the same type, but is differently sized for different items of laundry, in particular items of laundry of different types.

A further method for solving the object mentioned above, it also being possible for this method to be a preferred development of the method as disclosed herein and in the claims, is a method of measuring items of laundry, wherein the items of laundry are transported past a measuring device individually with opposite corners of one edge hanging in clip carriages which can be displaced along a rail, characterized in that the measuring device measures the sagging of the (upper) edge of the item of laundry, which is retained in the clip carriages by adjacent corners, and a lowermost location of the item of laundry hanging down from the clip carriages. Accordingly, items of laundry are measured by a measuring device which measures the sagging or the loop of the item of laundry, which is retained in clip carriages by adjacent corners, and the lowermost location of the item of laundry hanging down from the clip carriages. The width of the item of laundry can be determined at least qualitatively from the sagging or the loop of the edge or of the periphery retained on the clip carriages by the corners. The length of the item of laundry can be determined at least qualitatively from the lowermost location of the item of laundry hanging down from the clip carriage. The same, preferably single, measuring device can thus be used to determine two characteristic values of the item of laundry, which are sufficient for sorting purposes. The items of laundry can then be introduced into the respective path of the store or interim store in a state in which they have been sorted according to type.

The measuring device preferably establishes at least more or less at the same time the sagging, in particular the depth of the sagging of the edge of the respective item of laundry, and the lowermost corner of the same. This allows the at least qualitative measuring of the item of laundry, this measuring being sufficient in order to sort the laundry specifically, to take place in a short period of time in a single operation.

A preferred configuration of the method provides the measured value for the sagging or the loop, in particular the depth of the sagging or of the loop, of the edge of each item of laundry and the measured value for the lowermost location of the item of laundry to be set in relation to one another. For example, the quotient is formed from the measured value for the depth of the sagging or of the loop and for the lowermost location of the item of laundry (or vice versa). This ratio or the quotient or ratio value is used in order to determine the type of item of laundry and/or to identify the item of laundry. For example, it is possible to establish, by comparing the ratio with a reference value stored in a memory of an electronic evaluation unit, whether the item of laundry is a bed sheet, a bed cover or a pillow case. Forming the ratio allows each item of laundry to be reliably determined and/or identified even if the depth of the sagging or of the loop and the lowermost location of the item of laundry are being used merely more or less as reference values rather than to provide a qualitative determination of the length and the width of the item of laundry.

Provision is preferably made for the individual items of laundry to be transported past a single measuring device with defined, identical distances between the clip carriages and thus between the opposite corners of the respective edge or of the periphery retained by said clip carriages. The defined distance between the clip carriages, and thus also between the corners of the periphery of the item of laundry, make it possible to draw conclusions at least approximately, from the measured depth of the sagging or of the loop, as to the width of the measured item of laundry. The same also applies, on account of the distance between the corners always being identical during the measuring operation, to the lowermost location of the item of laundry. It is therefore possible for the length of the item of laundry to be determined at least approximately from the measured lowermost location or corner.

It is preferably possible for the length and width of the item of laundry, in accordance with the method of the invention, to be determined by comparatively close approximation if the measured values include the known, constant distance between the corners of the item of laundry on account of defined distances between the corner-retaining clip carriages. The length and the width of the respective item of laundry can then be determined computationally by close approximation.

In the case of an advantageous configuration of the method, the measuring device used is a line-measuring device. For example, the line-measuring device may be formed from a row made up of a multiplicity of successive sensors located on at least one straight line, in particular a vertical line. This line-measuring device can pick up, at the same time, a number of measured values for an item of laundry hanging in front of the measuring device. The measured values are preferably determined when the item of laundry has the location or the region with the greatest level of sagging and the lowermost location of the lower edge in front of the line-measuring device. The line-measuring device can then measure both the lowermost location of the sagging or of the loop of the upper periphery of the item of laundry and the lowermost location of the lower edge of the item of laundry, in particular the lowermost lower corner of the same.

A further method for achieving the aforementioned object is a method of measuring items of laundry, wherein the items of laundry are transported past a measuring device individually with opposite corners of one edge hanging beneath clip carriages, characterized in that the items of laundry are transported past the measuring device with a defined, constant distance between the clip carriages retaining adjacent corners of the periphery or edge of an identical item of laundry. In the case of this method, the item of laundry hanging on clip carriages by opposite corners of one edge or of one periphery is measured with a defined, constant distance between the adjacent-corner-retaining clip carriages. Each item of laundry is transported past the measuring device individually with a defined distance between the adjacent corners of the front or upper periphery or of the front or upper edge. The identical distance between the adjacent corners of the edge or of the periphery means that identical measuring conditions are created for each item of laundry, to be precise even for items of laundry of different sizes. This makes it possible to carry out measurements which can be reproduced. The defined, known distance between the corners of the edge or of the periphery of each item of laundry makes it possible to draw conclusions reliably, from the measured values, to be precise both for the sagging depth and for the lowermost corner of the item of laundry, as to the type of the respective item of laundry, in which case the latter can be clearly identified and sorted according to type. The known, defined distance between the corners of the respective item of laundry however, may also be used in order to determine the width and the length of the respective item of laundry computationally by the closest possible approximation.

An apparatus for achieving the object on which the invention is based is an apparatus by means of which items of laundry hanging on clip carriages by adjacent corners of one edge are transported to a treatment device, having a feed conveyor with a rail, and having a downstream rail, along which the clip carriages can be moved, and having a separating device at the end of the rail of the feed conveyor, characterized in that the separating device is designed for optionally discharging an individual clip carriage or two clip carriages at the same time from the rail of the feed conveyor. This apparatus provides a separating device which is designed for optionally discharging an individual clip carriage or two clip carriages at the same time from a feed rail. It is thus possible, initially, for just one clip carriage, retaining the foremost corner of the first item of laundry, to be discharged by the separating device, whereas, thereafter, always two clip carriages are discharged at the same time, to be precise specifically following or in-contact clip carriages for retaining adjacent corners of different, but successive items of laundry. If transportation should be interrupted, it is also possible, at the end, for just a single clip carriage to be discharged by the separating device. However, this clip carriage, then, is the one which retains the rearmost, second corner of the final item of laundry in the batch.

The separating device is preferably provided with two parallel catches, which are arranged preferably one beside the other. The catches can be optionally activated, to be precise such that, upon actuation of the one catch, just a single clip carriage can be discharged at the end of the feed rail and, upon actuation of the other catch, two successive clip carriages, preferably in contact with one another, can be discharged at the same time. The two catches thus make it possible to select whether just a single clip carriage or two clip carriages at the same time should be discharged.

Another advantageous configuration of the apparatus provides for the feed rail to be inclined downwards towards its end to which the separating device is assigned. This allows the clip carriages to roll automatically, in a gravity-induced fashion, along the feed rail to the lower-level end with the separating device. At the lower end of the feed rail, the clip carriages then also pass automatically into the region of influence of the separating device. It is therefore the case that, as it were, a plurality of clip carriages wait, upstream of the separating device, for discharge or for individual separation or paired separation upon discharge. On account of it being inclined downwards, the feed rail itself has no need for any circulating conveying line with drivers for the clip carriages.

BRIEF DESCRIPTION OF THE DRAWINGS

A preferred exemplary embodiment of the invention will be explained in more detail hereinbelow with reference to the drawing, in which.

DETAILED DESCRIPTION OF PREFERRED EMBODIMENTS

The figures show part of an apparatus for feeding items of laundry 10 to a treatment device (not shown), for example to an inserting machine, for feeding the items of laundry in a spread-out state to a mangle. The apparatus also has a store (not shown in the figures either) made up of a plurality of storage sections, wherein each storage section serves for accommodating a plurality of items of laundry 10 of the same type. In the store, then, the items of laundry 10 are stored on an interim basis in a state in which they have been separated according to type, until they are advanced to the inserting machine.

Figure 1:
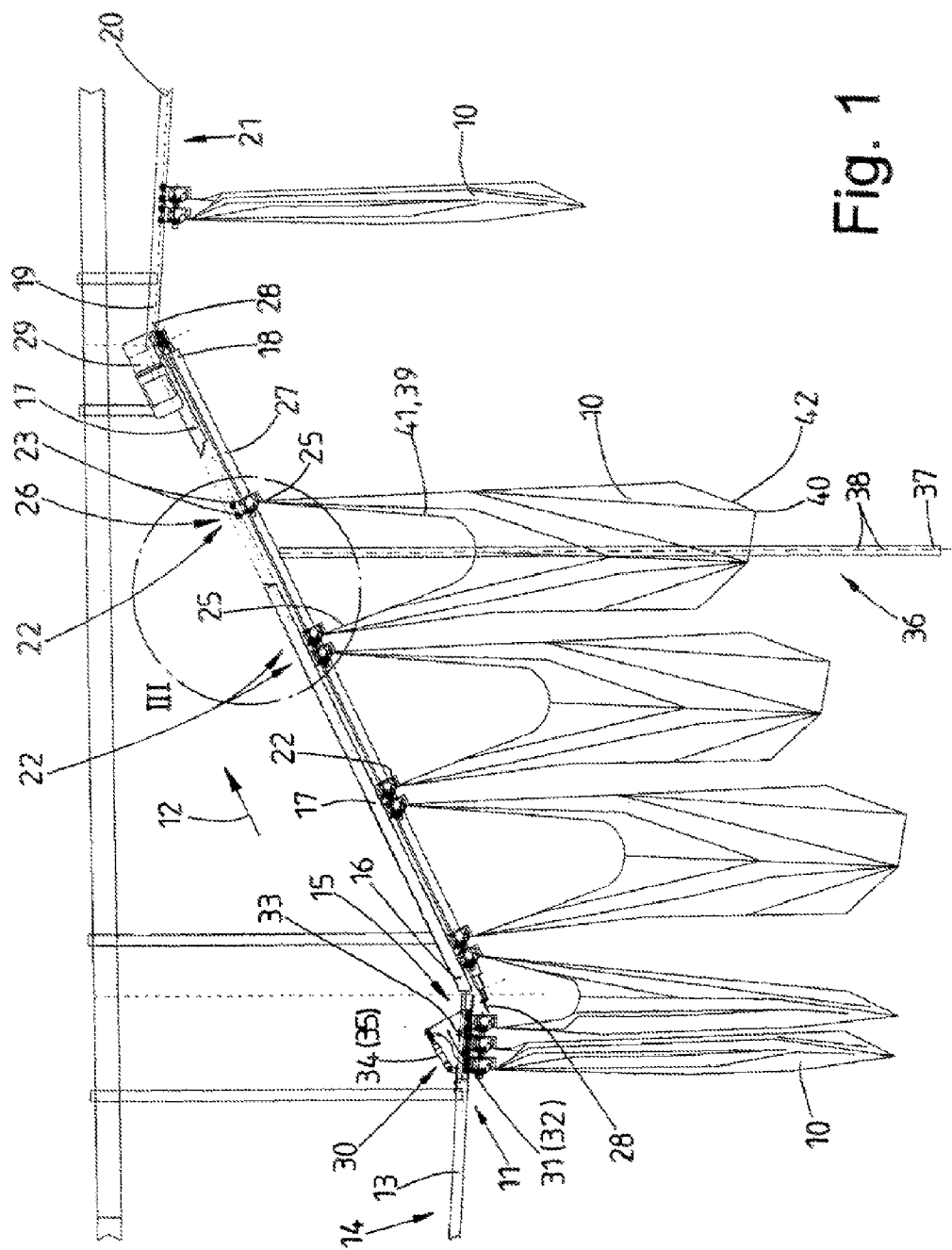
FIG. 1 shows part of an apparatus for feeding items of laundry to a treatment device.
Figure 2:
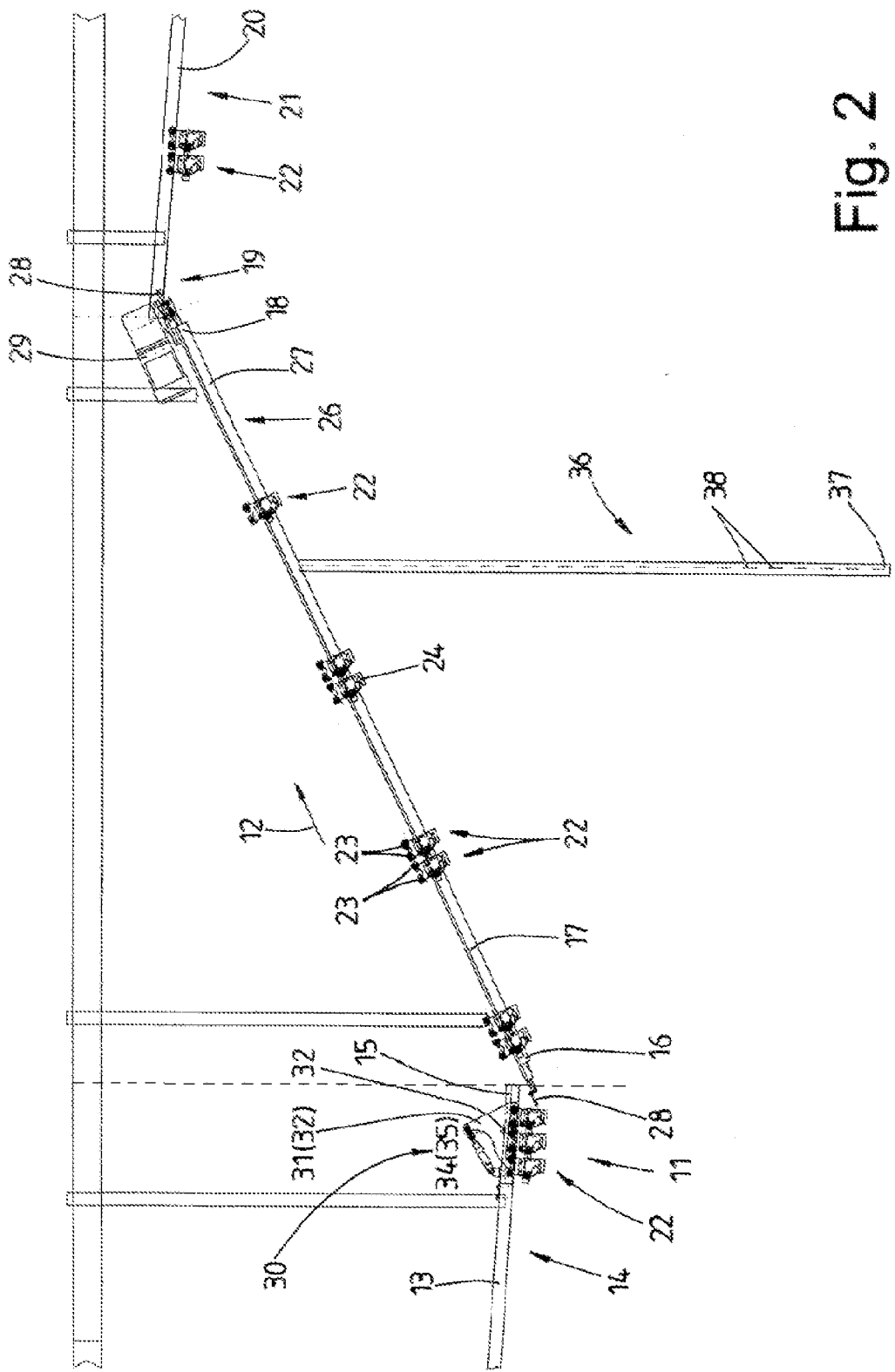
FIG. 2 shows an illustration analogous to FIG. 1, but without items of laundry hanging on clip carriages and with no rail on which the clip carriages can be displaced.
Figure 3:
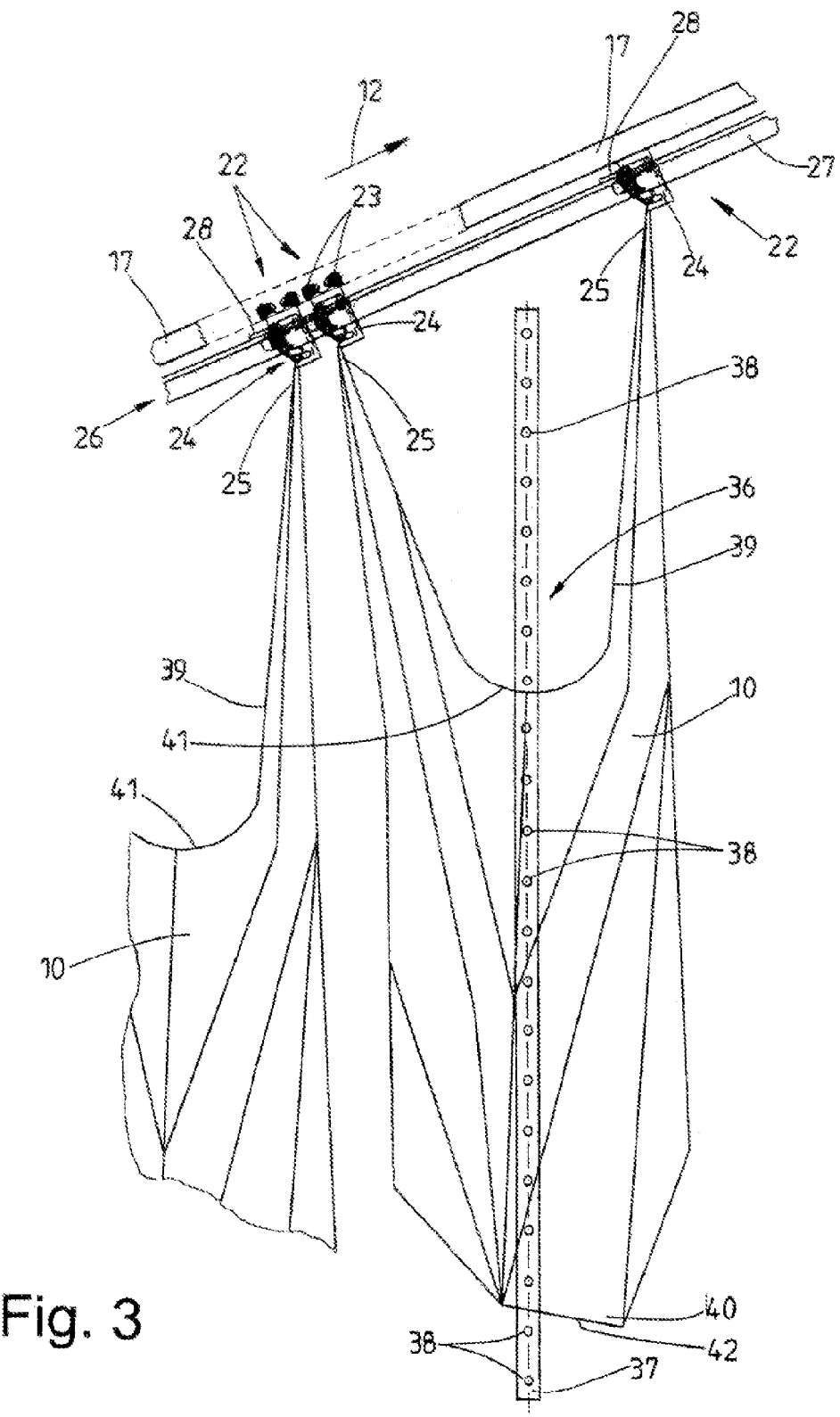
FIG. 3 shows an enlarged detail III from FIG. 1.

FIGS. 1 and 2 shows an end region 11 of a rail 13 which is inclined slightly in the transporting direction 12, forms a feed conveyor 14 and is a constituent part of the same. An end 15 of the rail 13 is followed, essentially without any transition, but at an obtuse angle, by the start 16 of a further rail 17. This rail 17 slopes upwards from the start 16 to the opposite end 18. The end of the rail 17 is followed by a start of a further rail 20, which may be a constituent part of a removal conveyor 21, which is inclined downwards in the transporting direction 12. From the removal conveyor 21, the items of laundry 10 pass into the store (not shown), to be precise they pass, in a state in which they have been separated according to type, into a specific one of a number of preferably parallel storage sections.

Identically designed clip carriages 22 can be displaced in or on the rails 13, 17 and 20. Each clip carriage 22 has four wheels 23, wherein in each case two wheels 23 are assigned to the ends of an axle. It is therefore the case that in each case two wheels 23 are distributed between two horizontal axles running parallel in a direction transverse to the transporting direction 12. The running gear of the clip carriage 22 is thus designed in the manner of a tandem axle. The wheels 23 on the axles of each clip carriage 22, said axles being located one behind the other in the transporting direction 12, run either in the rails 13, 17 and 20, these having an appropriate cross section, or outside the rails 13, 17, 20. Beneath the wheels 23, each clip carriage 22 has a clip 24 for accommodating a corner 25 of an item of laundry 10. The clips 24 of the clip carriages 22 are located outside, and beneath, the respective rail 13, 17 and 20. A corner 25 of an item of laundry 10 is fitted into the respective clip 24, preferably manually, at a loading station (not shown), which may be located, for example, at the start of the rail 13.

As a result of the rails 13 and 20 being inclined downwards in the transporting direction 12, the clip carriages 22 with the items of laundry 10 hanging thereon run automatically, in gravity-induced fashion, in the transporting direction 12 along the rails 13 and 20. The upward slope of the rail 17 means that the clip carriages 22 with the items of laundry 10 hanging thereon are driven, to be precise preferably continuously, along said rail 17 in the transporting direction 12. For this purpose, the rail 17 is assigned a so-called catch conveyor 26. In the exemplary embodiment shown, the catch conveyor 26, which is a continuous conveyor, is arranged just beneath the rail 17 and runs parallel to the same, albeit in a manner offset excentrically in relation to the longitudinal direction of the rail 17.

The catch conveyor 26 has a circulating conveying line 27, possibly a belt, a chain, a cable or a flat band, on which a plurality of catch-forming drivers 28 are arranged in a fixed state at identical, regular intervals. The circulating conveying line 27 of the catch conveyor 26 has one strand arranged beneath the rail 17, to be precise preferably at a parallel distance alongside a vertical longitudinal center plane through the rail 17. This strand of the conveying line 27, which extends along the entire rail 17, gives rise to the clip carriages 22 being advanced in an upwardly sloping manner along the rail 17 in the transporting direction 12. The identically designed drivers 28 on the conveying line 27 project, to be precise in an approximately horizontally directed manner, to the same side of that strand of the conveying line 27 which is assigned to the rail 17. The drivers 28 here pass through the vertical longitudinal center plane of the rail 17. As a result, the drivers 28 intersect the pathway taken by the clip carriages 22 along the upwardly sloping rail 17 and thus push the clip carriages 22 in front of them along the upwardly sloping rail 17 in the transporting direction 12. The conveying line 27 of the catch conveyor 26 is driven in circulation by a geared motor 29 above the end 18 of the rail 17.

The end 15 of the rail 13 of the feed conveyor 14 and the start 16 of the following rail 17 follow one after the other in alignment in the transporting direction 12, in which case the rail 13 is followed, essentially without any transition, by the rail 17 and the wheels 23 of the clip carriages 22 can run out of the rail 13 into the rail 17. It is also conceivable, however, to provide, between the end 15 of the rail 13 and the start 16 of the rail 17, a transition piece which guides the wheels 23 of the clip carriages 22 at the transition from the rail 13 to the rail 17.

A semicircular deflection of the conveying line 27 between the idling strand, which is spaced apart further from the rail 17, and the strand which advances the clip carriages 22 along the rail 17 is positioned in the region of the start 16 of the rail 17 such that there is always an externally projecting driver 28 of the conveying line 27 engaging behind, in the first instance, one, and subsequently, always two directly successive, in-contact clip carriages 22 and pushing the latter in front of them in the upwardly sloping transporting direction 12 along the rail 17. The drivers 28 here engage behind that part of the clip carriage 22 which is located beneath the rail 17, to be precise the rear side of the respective clip 24 just beneath the rail 17.

The end of the rail 13 is assigned a separating device 30. This is a kind of device for separating the clip carriages 22, but one which is designed in a specific manner, that is to say for discharging either just a single clip carriage 22 or two successive clip carriages 22 from the rail 13. In other words, the separating device 30 is used for a specific way of separating the clip carriages 22 which makes it possible for optionally just a single clip carriage 22 or two directly successive clip carriages 22 to be engaged at the same time and thus to be separated from the following clip carriages 22, which have run together in the region of the end 15 of the rail 13. The clip carriages 22, which are separated optionally individually or in pairs and discharged, are then introduced, by a driver 28, into the rail 17 and pushed along the same by a respective driver 28.

In order for it to be possible for optionally a single clip carriage 22 or two clip carriages 22 at the same time to be separated and discharged by the separating device 30, the separating device 30 is designed in a specific manner. For this purpose, the separating device 30 has two parallel catches 31 and 32, which are located close up alongside one another and can be pivoted about a common horizontal axis 33 in a respective one of two parallel vertical planes extending in the transporting direction 12. The catches 31, 32 are pivoted by an actuator 34, 35, for example a respective pneumatic cylinder, assigned to the respective catches 31, 32. FIGS. 1 and 2 show just a single, front catch 31 with the associated actuator 34. The second catch 32 and the associated actuator 35 are located approximately congruently behind the first. The catch 31, which is shown in FIGS. 1 and 2, is designed to separate, at the same time, two clip carriages 22 located one behind the other, in contact with one another, in a transporting direction 12 and to discharge the same from the end 15 of the rail 13 of the feed conveyor 14 and restrain the clip carriages 22 located behind. The rear catch 32 (not shown) is designed such that it frees only the foremost clip carriage 22 for separating purposes and restrains the following, second clip carriage.

In the region of the rail 17, to be precise approximately in a central region of the same, a line-measuring device 36, which serves for measuring an individual item of laundry 10 in each case, is arranged in a fixed state beneath the rail 17. The line-measuring device 36 is located vertically approximately alongside the vertical longitudinal center plane extending through the rail 17, to be precise such that items of laundry 10 hanging down freely from the clip carriages 22 can run past the line-measuring device 36 individually at the smallest possible distance therefrom, but without coming into contact with the same. The line-measuring device 36 is of such a length that its lower end 37 is located at a lower level than the lowermost location which would be expected for the largest possible item of laundry 10.

The line-measuring device 36, in the present case, is formed from a multiplicity of sensors 38, which are arranged at uniform intervals along a vertical row. This vertical row extends in the longitudinal direction of the line-measuring device 36. Each of the identical sensors 38 may be one which determines optically, or even pneumatically, whether an item of laundry 10 is passing through or covering its horizontal measuring axis, which runs transversely to the transporting direction 12, or whether the item of laundry 10 is leaving it uncovered, that is to say is not covering or passing through the measuring axis. This makes it possible to measure at the same time, as the respective item of laundry 10 is running past the line-measuring device 36, on the one hand, the sagging of an upper edge 39 of the item of laundry 10, which is retained by the clip carriage 22 at adjacent corners 25, and, on the other hand, the lowermost location 40 of the item of laundry 10 hanging down from the clip carriages 22.

In order to measure the sagging of the upper edge 39 of the item of laundry 10, the greatest depth of a loop 41 formed in front of the sagging edge 39 is determined by virtue of establishing the maximum value of the distance between the loop 41 in the upper edge 39 of the item of laundry 10, said upper edge hanging down from the clip carriages 22, and the upper end of the line-measuring device 36. The lowermost location 40 or lowermost corner is determined in precisely the same way, by measuring the greatest distance between the lower edge 42 of the item of laundry 10 and the upper end of the line-measuring device 36 as said item of laundry 10 is transported past the line-measuring device 36.

The method according to the invention will be explained in more detail hereinbelow with reference to the apparatus described above:

At at least one loading station (not shown), the items of laundry 10 have opposite corners 25 of the upper edge 39 or the upper periphery fitted into clips 24 of successive clip carriages 22. The clip carriages 22 with the items of laundry 10 hanging thereon are conveyed automatically, under gravitational force, in the transporting direction 12 along the inclined rail 13 to the end 15 of the same. Here, the clip carriages 22 with the items of laundry 10 hanging thereon collect upstream of the separating device 30.

By means of the separating device 30, the clip carriages 22 with the items of laundry 10 hanging thereon are discharged specifically individually or in pairs from the rail 13 and transferred from the end 15 of the rail 13 to the start 16 of the rail 17. The separating device 30 is designed such that it separates optionally just a single clip carriage 22 or a pair of two clip carriages 22 which follow immediately one after the other in contact with one another. The operation of discharging just a single clip carriage 22 or a pair of two clip carriages 22 is carried out by the separating device 30 by virtue of the one catch 31 or of the other catch 32 being optionally actuated by the associated actuator 34 or 35, respectively.

In specific terms, the procedure is such that the clip carriage 22 which is leading in the transporting direction 12, and retains the first corner 25 of the first item of laundry 10 is discharged individually by the correspondingly controlled separating device 30 and displaced along the rail 17 by a driver 28 of the catch conveyor 26. All the other clip carriages 22 are discharged in pairs by the separating device 30, to be precise the clip carriage 22 which retains that corner 25 of a front item of laundry 10 which is trailing in the transporting direction 12 and the clip carriage 22 located immediately behind this, retaining that corner 25 of the next item of laundry 10 which is leading in the transporting direction 12. Following the initial operation of discharging just a single clip carriage 22, there are always two clip carriages 22 discharged in pairs at the same time until the final item of laundry 10 has been reached. Here, the clip carriage 22 retaining the rearmost corner 25 is discharged individually again.

The uniform, unaltered distance between the drivers 28 on the conveying line 27 of the catch conveyor 26 means that the two corners 25 of the upper edge 39 of each item of laundry 10, said upper edge sagging in a loop 41, are spaced apart by a defined, unalterable identical distance. As a result, the items of laundry 10 are transported past the line-measuring device 36 always with a fixed, identical distance between the corners 25 of the upper edge 39 along the rail 17. This operation takes place preferably continuously, in which case the measuring operation is carried out in uninterrupted fashion as a respective individual item of laundry 10 is transported past the line-measuring device 36.

While an individual item of laundry 10 hanging on two clip carriages 22 by opposite corners 25 is moved past the line-measuring device 36, the latter determines the lowermost location of the lower edge 42 of the item of laundry 10 hanging down from the clip carriages 22 and the lowermost location of the loop 41 of the upper edge 39 of the item of laundry 10. The clip carriages 22 retaining the two corners 25 of the upper edge 39 of the item of laundry 10 here are spaced apart by an unalterable distance, which is also the same for all the clip carriages 22 retaining other items of laundry 10. The measuring operations take place such that, as an item of laundry 10 is moved past the line-measuring device 36, the latter continuously determines the hanging-down lower edge 42 and the upper edge 39 in a region of the loop 41 in respect of the distance thereof from the upper end of the line-measuring device 36. A comparison of successive measured values for the upper edge 39 and the lower edge 42 of the respective item of laundry 10 makes it possible to determine the maximum distances of the upper edge 39 and of the lower edge 42 from the upper end of the line-measuring device 36. These maximum distances each give a measured value for the lowermost location of the loop 41 and for the lowermost location 40 of the lower edge 42 of the item of laundry 10. These measured values are preferably processed, and/or evaluated, in a computer or a control means for diverters of the individual storage sections of the store for the purpose of sorting the items of laundry 10.

The measured value for the lowermost location of the loop 41 of the upper edge 39, on the one hand, and that for the lowermost location 40 of the lower edge 42, on the other hand, are used, by way of forming a quotient, to form a ratio which makes it possible to draw conclusions as to the length/width ratio of the item of laundry 10 measured in each case at the line-measuring device 36. This ratio, or length/width ratio, can be used to identify the respective item of laundry 10, in particular by type, for example as to whether the item of laundry 10 measured is a bed sheet, a bed cover, a pillow case or a tablecloth.

The (length/width) ratios are stored in the computer or the control means as reference values for each different item of laundry 10, in which case, by comparing the measured (length/width) ratios or ratio values with the reference values stored, the control means or the computer can establish which type of item of laundry is currently being processed. Accordingly, it is then possible for the items of laundry 10 of the respective type, for example bed covers, to be stored in a state in which they have been sorted according to type in the same storage section of the store. The items of laundry 10 can then be fed in a sorted state from the respective storage section to the treatment apparatus, for example to an inserting machine upstream of a mangle.

LIST OF DESIGNATIONS

10 Item of laundry
11 End region
12 Transporting direction
13 Rail
14 Feed conveyor
15 End
16 Start
17 Rail
18 End
19 Start
20 Rail
21 Removal conveyor
22 Clip carriage
23 Wheel
24 Clip
25 Corner
26 Catch conveyor
27 Conveying line
28 Driver
29 Geared motor
30 Separating device
31 Catch
32 Catch
33 Axis
34 Actuator
35 Actuator
36 Line-measuring device
37 End
38 Sensor
39 Upper edge
40 Lowermost location
41 Loop
42 Lower edge

What is claimed is:

1. A method by means of which items of laundry (10) hanging on clip carriages (22) by adjacent corners (25) of one edge (39) are transported to a treatment device, wherein the clip carriages (22) are displaced along a rail (17) by drivers (28) which are moved along the rail (17), and wherein the clip carriages (22) are supplied to the driver (28) by a separating device (30) at the start (16) of the rail (17), wherein adjacent clip carriages (22) of successive items of laundry (10) are supplied to a respective driver (28) in pairs by the separating device (30).

2. The method according to claim 1, wherein successive clip carriages (22) retaining adjacent corners (25) of two successive items of laundry (10) are advanced along the rail (17) together, one behind the other, by a driver (28), preferably in the direction of upward slope of the obliquely running rail (17).

3. The method according to claim 1, wherein the clip carriages (22) retaining adjacent corners (25) of the edge (39) of the respective item of laundry (10) are advanced along the rail (17) by two successive, spaced-apart drivers (28), preferably with a constant, defined distance between the two clip carriages (22) retaining the corners (25) of the item of laundry (10).

4. The method according to claim 1, wherein the items of laundry (10) are transported past a measuring device individually with opposite corners (25) of one edge (39) hanging in clip carriages (22) which can be displaced along a rail (17), wherein the measuring device measures the sagging of the (upper) edge (39) of the item of laundry (10), which is retained in the clip carriages (22) by adjacent corners (25), and a lowermost location (40) of the item of laundry (10) hanging down from the clip carriages (22).

5. The method according to claim 1, wherein the items of laundry (10) are transported past a measuring device individually with opposite corners (25) of one edge (39) hanging beneath clip carriages (22), wherein the items of laundry (10) are transported past the measuring device with a defined, constant distance between the clip carriages (22) retaining adjacent corners (25) of the periphery or edge (39) of an identical item of laundry (10).

6. A method of measuring items of laundry (10), wherein the items of laundry (10) are transported past a measuring device individually with opposite corners (25) of one edge (39) hanging in clip carriages (22) which can be displaced along a rail (17), wherein the measuring device measures the sagging of the (upper) edge (39) of the item of laundry (10), which is retained in the clip carriages (22) by adjacent corners (25), and a lowermost location (40) of the item of laundry (10) hanging down from the clip carriages (22).

7. The method according to claim 6, wherein the measuring device measures, at the same time, the sagging, in particular the depth of the sagging, of the upper edge (39) of the respective item of laundry (10) and the lowermost location in particular of the lower edge (42) of the same item of laundry (10).

8. The method according to claim 6, wherein the measured value for the sagging of the upper edge (39) of the item of laundry (10) and the measured value for the lowermost location (40) of the lower edge (42) of the item of laundry (10) are set in relation to one another, and the resulting ratio is used for determining the type of item of laundry (10) and/or for identifying the item of laundry (10).

9. The method according to claim 6, wherein the individual items of laundry (10) are transported past the measuring device with a defined, identical distance between the clip carriages (22) and the opposite corners (25) of the upper edge (39) which are retained by said clip carriages.

10. The method according to claim 6, wherein the measuring device used is a line-measuring device (36) with preferably a row made up of a multiplicity of sensors (38) located on at least one straight, in particular vertical, line.

11. The method according to claim 6, wherein the items of laundry (10) are transported past a measuring device individually with opposite corners (25) of one edge (39) hanging beneath clip carriages (22), wherein the items of laundry (10) are transported past the measuring device with a defined, constant distance between the clip carriages (22) retaining adjacent corners (25) of the periphery or edge (39) of an identical item of laundry (10).

12. A method of measuring items of laundry (10), wherein the items of laundry (10) are transported past a measuring device individually with opposite corners (25) of one edge (39) hanging beneath clip carriages (22), wherein the items of laundry (10) are transported past the measuring device with a defined, constant distance between the clip carriages (22) retaining adjacent corners (25) of the periphery or edge (39) of an identical item of laundry (10).

13. An apparatus by means of which items of laundry (10) hanging on clip carriages (22) by adjacent corners (25) of one edge (39) are transported to a treatment device, having a feed conveyor (14) with a rail (17), and having a downstream rail (17), along which the clip carriages (22) can be moved, and having a separating device (30) at the end (15) of the rail (13) of the feed conveyor (14), wherein the separating device (30) is designed for optionally discharging an individual clip carriage (22) or two clip carriages (22) at the same time from the rail (13) of the feed conveyor (14).

14. The apparatus according to claim 13, wherein the separating device (30) has two parallel catches (31, 32), which are arranged preferably one beside the other and can optionally be actuated such that, upon activation of the one catch (32), just a single clip carriage (22) can be discharged at the end (15) of the rail (13) and, upon actuation of the other catch (31), two successive clip carriages (22) can be discharged at the same time in a pair.

15. The apparatus according to claim 13, wherein the rail (13) of the feed conveyor (14) is inclined downwards towards its rear end (15), to which the separating device (30) is assigned, for gravity-induced automatic displacement of the clip carriages (22) along the rail (13).

16. The apparatus according to claim 13, wherein the rail (13) of the feed conveyor (14) has arranged downstream of it, as seen in a transporting direction (12), the rail (17), which slopes up in the transporting direction (12), and preferably said rail (17) is assigned a catch conveyor (26) with uniformly spaced-apart drivers (28) for advancing either a single clip carriage (22) or two clip carriages (22), in close succession, along the upwardly sloping rail (17), as seen in the transporting direction (12).

17. The apparatus according to claim 14, wherein the rail (13) of the feed conveyor (14) is inclined downwards towards its rear end (15), to which the separating device (30) is assigned, for gravity-induced automatic displacement of the clip carriages (22) along the rail (13).

18. The apparatus according to claim 14, wherein the rail (13) of the feed conveyor (14) has arranged downstream of it, as seen in a transporting direction (12), the rail (17), which slopes up in the transporting direction (12), and preferably said rail (17) is assigned a catch conveyor (26) with uniformly spaced-apart drivers (28) for advancing either a single clip carriage (22) or two clip carriages (22), in close succession, along the upwardly sloping rail (17), as seen in the transporting direction (12).

19. The apparatus according to claim 15, wherein the rail (13) of the feed conveyor (14) has arranged downstream of it, as seen in a transporting direction (12), the rail (17), which slopes up in the transporting direction (12), and preferably said rail (17) is assigned a catch conveyor (26) with uniformly spaced-apart drivers (28) for advancing either a single clip carriage (22) or two clip carriages (22), in close succession, along the upwardly sloping rail (17), as seen in the transporting direction (12).

* * * * *